March 23, 1965 F. P. HOLDER 3,175,155

SUBMODULATION SYSTEMS FOR CARRIER RE-CREATION AND DOPPLER CORRECTION IN SINGLE-SIDEBAND ZERO-CARRIER COMMUNICATIONS

Original Filed Jan. 6. 1961 3 Sheets-Sheet 1

INVENTOR.
F. P. HOLDER

BY Wade Koontz
ATTORNEY
James S. Shannon
AGENT

INVENTOR.
F. P. HOLDER
BY [signature]
ATTORNEY
[signature]
AGENT

INVENTOR.
F. P. HOLDER
BY Wade Koontz
ATTORNEY and
James S. Shannon
AGENT

United States Patent Office 3,175,155 Patented Mar. 23, 1965

3,175,155

SUBMODULATION SYSTEMS FOR CARRIER RE-CREATION AND DOPPLER CORRECTION IN SINGLE-SIDEBAND ZERO-CARRIER COMMUNICATIONS

Floyd P. Holder, Marietta, Ga., assignor to the United States of America as represented by the Secretary of the Air Force Original application Jan. 6, 1961, Ser. No. 81,205. Divided and this application May 8, 1964, Ser. No. 366,209
1 Claim. (Cl. 325—50)

Figure 1:
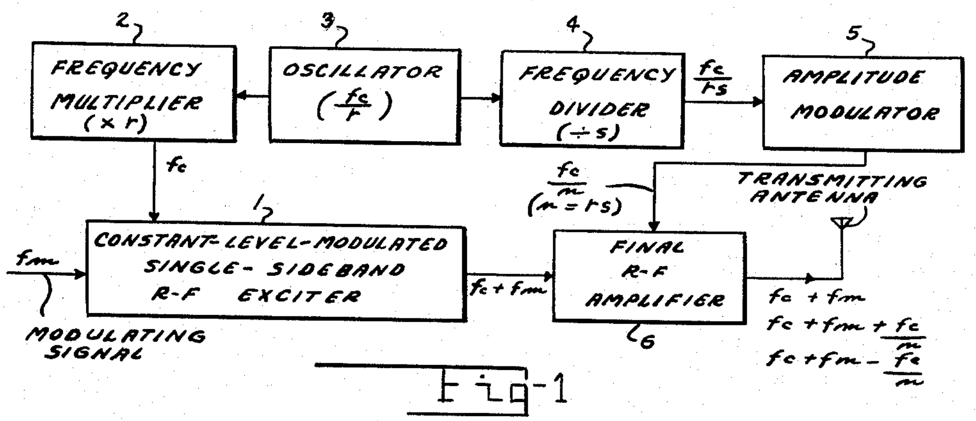

This application is a division of my application Serial No. 81,205, filed January 6, 1961.

In the interest of interference reduction and bandwidth conservation, considerable attention has been given to the use of single-sideband zero-carrier transmission. In order to perform satisfactory detection of the signals used in this type of transmission, it is necessary to supply the missing carrier at the receiver. In the case of a single-sideband system utilizing only stationary or slowly moving transmitters and receivers, the missing carrier may be synthesized, at a frequency which is roughly correct, by the operator manually tuning a variable-frequency local oscillator until, in his judgment, the receiver output sounds right. Another method of synthesizing the carrier in a system involving only stationary or slowly moving stations is to use, at the receiver, a local oscillator having its frequency automatically set within close tolerance to the transmitter frequency according to prior knowledge of this frequency. Where there is no prior knowledge, this method fails. Even when there is prior knowledge, the synthesized carrier frequency must be correct to within about 20 cycles for intelligible reception of a voice transmission. However, in the case of a single-sideband zero-carrier (SSZC) system utilizing high-frequency receivers and transmitters that are rapidly moving with respect to each other so that Doppler effect is pronounced, the foregoing methods of detection fail because of the inability to determine accurately the frequency position of the missing carrier.

Several means are available to overcome this difficulty, but most of these effectively require the transmission of a carrier component which is used at the receiver to reestablish the frequency of the missing carrier. Consequently, such systems are not true zero-carrier systems; hence they are susceptible to the heterodyne type of interference. It is possible, however, to transmit information about the frequency of the missing carrier without transmitting any component at the carrier frequency, so that the difficulty of the previously mentioned heterodyne interference is overcome. This lack of heterodyne interference is due to the fact that the frequency at which the carrier information is transmitted depends on the frequency of the modulating signal. In the case of modulation by a speech wave, the frequency of the transmitted carrier information is rapidly changing in a very erratic manner, with the result that no whistles or steady tones are produced.

The method described here is called the submodulation method. It involves a form of duplexing and makes use of a constant-level modulation system such as the one described by Marcou and Daguet in a paper entitled "New Methods of Speech Transmission" in the publication of Centre National d'Etudes des Telecommunications, September 15, 1955. The intelligence to be transmitted is used to modulate a constant-level single-sideband zero-carrier transmitter as in the above paper. However, before the constant-level signal is radiated, it is amplitude-modulated by a low-frequency sine wave which is at some integral submultiple of the missing-carrier frequency.

Thus, the phase and frequency variations of the transmitted signal carry the intelligence, and the amplitude variations contain the information about the frequency of the missing carrier. At the receiver the signal is channeled into two paths. In the first path the envelope is recovered in a conventional envelope detector, the detected output being a sine wave the frequency of which is at an integral submultiple of the carrier frequency. This wave is then fed to a frequency multiplier, the output of which is precisely at the Doppler-corrected frequency of the missing carrier. In the second path, the incoming signal is amplitude-limited to remove all modulation due to the presence of the carrier information. The output of the limiter is then the original constant-level single-sideband zero-carrier signal that was formed at the transmitter. This signal may now be detected by use of the carrier generated in the previously described first path.

The submodulation method of recovering the missing carrier and correcting for Doppler shift in a SSZC system is so called because the intelligence sideband-spectrum components serve as carriers for the actual carrier information transmitted. The brief outline of this method given above primarily applies to a relatively elementary system. However, a number of variations have been devised and culminate in a refined version which offers the advantages of highly stable superheterodyne reception and permits the effective bandwidth of the receiver to be limited to almost exactly that of a constant-level SSZC signal as generated. The only bandwidth discrepancy which must be allowed for in the refined system is the extremely small bandwidth change caused by the Doppler effect.

Figure 2:
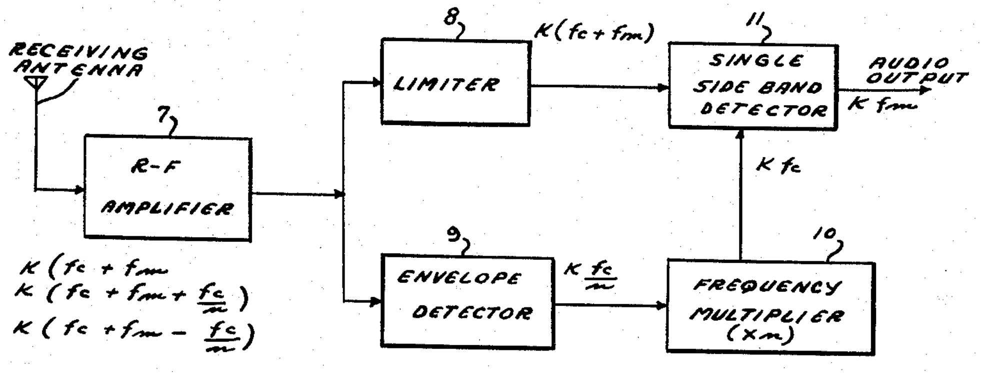
Figure 3:
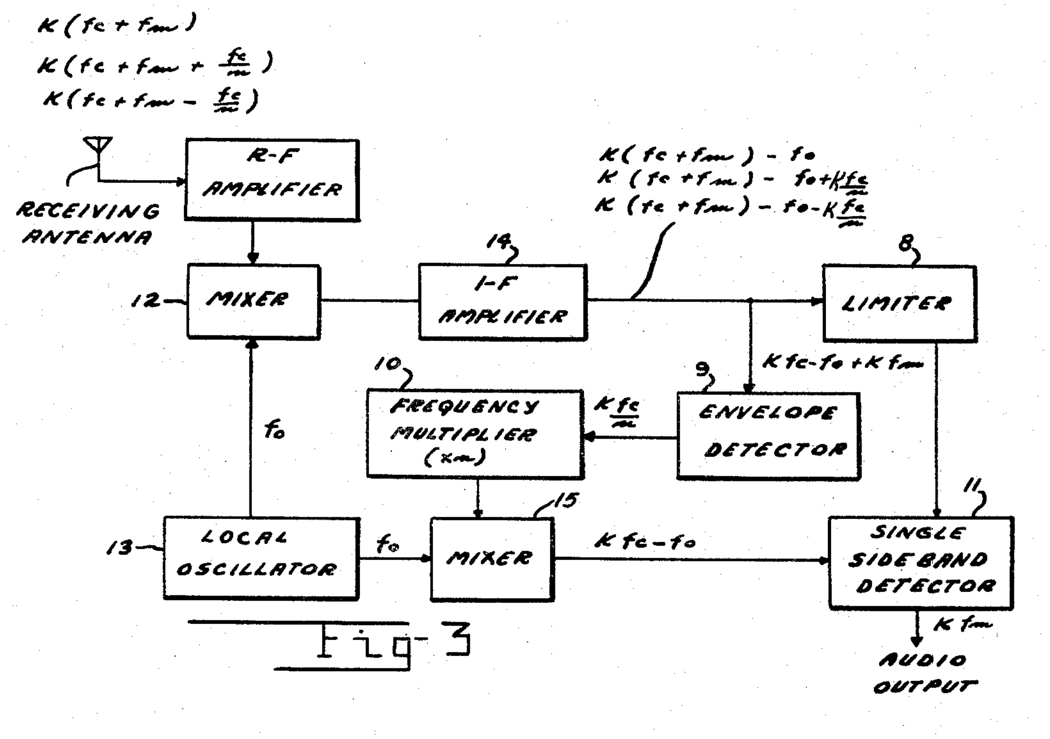
Figure 4:
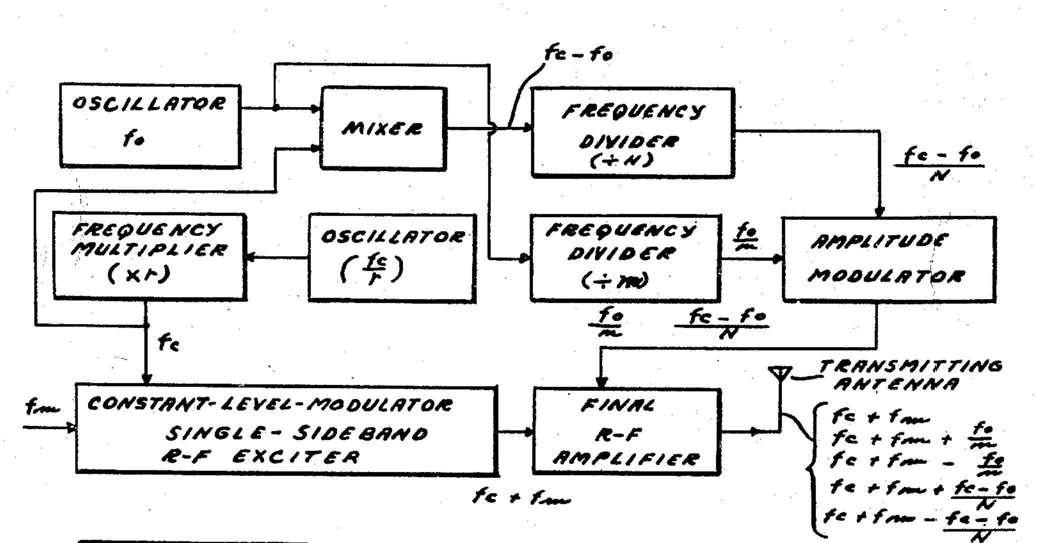
Figure 5:
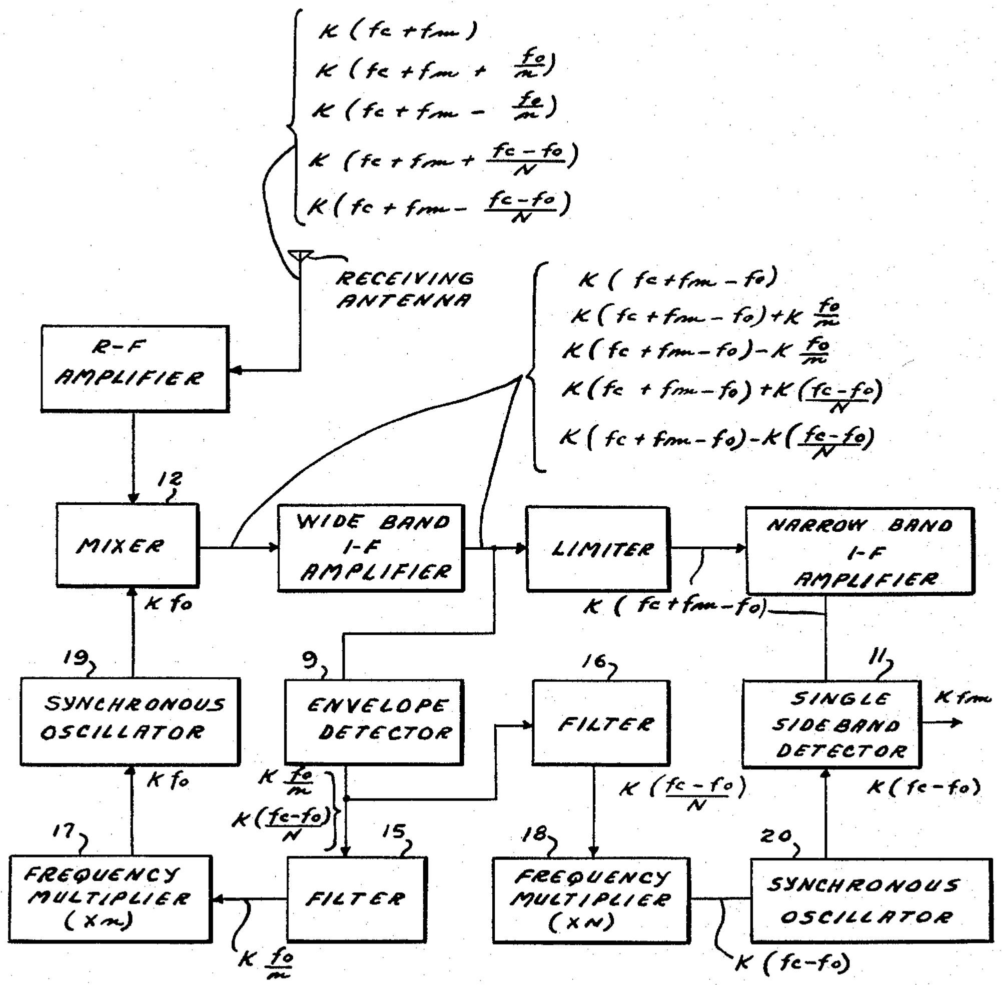

A detailed discussion of specific embodiments of the various forms of the invention will be given with reference to the accompanying drawings in which:

FIGS. 1 and 2 show the transmitter and receiver for the basic submodulation system, FIG. 3 shows a form of superheterodyne receiver that may be used in the submodulation system, and FIGS. 4 and 5 show the transmitter and receiver usable in a modified form of the submodulation system giving greater I-F selectivity.

Referring to FIG. 1, which shows the transmitter for the basic system, the constant-level-modulated single-sideband radio frequency exciter 1 produces a single sideband signal $f_c+f_m$ of constant level, assuming upper sideband transmission. The exciter 1 may be of the type described in the above-mentioned paper by Marcou and Daguet, its design not being a part of the invention. The carrier $f_c$ is obtained by a multiplication, in frequency multiplier 2, of the output of oscillator 3. The frequency of oscillator 3 is also divided by a factor $s$, in frequency divider 4, and the resulting frequency $$\frac{f_c}{rs}$$

is applied to amplitude modulator 5 which amplitude modulates the output of final R-F amplifier 6. Since $r$ and $s$ are integers, the amplitude modulation of the amplifier 6 output is at an integral submultiple $n=rs$ of the carrier frequency $f_c$. The output of amplifier 6 therefore contains the constant level sideband $f_c+f_m$ and the upper and lower sidebands resulting from the amplitude modulation of this sideband by the signal $$\frac{f_c}{n}$$

namely, $$f_c \quad f_m+\frac{f_c}{n} \text{ and } f_c+f_m-\frac{f_c}{n}$$

Assume that the modulation factor of this sinusoidal modulation is appreciably less than unity—for example, 25 percent. If the intelligence should consist of a single tone, then the radiated spectrum would be exactly that of an ordinary sine-wave-modulated full-carrier A-M wave being modulated to a depth of 25 percent. In this case, all the energy of the sinusoidal modulation will be concentrated at the two frequencies spaced symmetrically about the intelligence tone frequency. However, where the intelligence is complex, as it ordinarily is, the symmetrical sub-sidetones exist about each intelligence spectral element and the submodulation energy is distributed over the entire sideband. Consequently, these pairs of sub-sidetones may be thought of as being first at one pair of frequencies, then at another. Because of the complex and constantly changing nature of the intelligence wave which now is serving as a carrier, the pairs of symmetrical sub-sidetones are also constantly changing in amplitude and frequency and hence will not cause the heterodyne type of interference, for the same reason that an ordinary single-sideband zero-carrier transmission does not.

In the receiver, shown in FIG. 2, the composite signal, which may have undergone a change in frequency by a factor $k$ due to the Doppler effect, is handled in the usual manner by the amplification and the selectivity of the R.-F. amplifier 7. The total maximum bandwidth needed to accommodate the incoming R.-F. wave usually need not be much greater than the maximum bandwidth of the single sideband without the submodulation. In fact, the excess bandwidth will be just twice the submodulation frequency. After R.-F. amplification, the composite signal is fed into two channels. In one of these channels the composite signal is amplitude-limited by limiter 8 to remove the amplitude modulation. No energy corresponding to the submodulation will remain as phase modulation if the sub-sidebands have been maintained actually symmetrical and if no phase modulation has been permitted to occur in the transmitter in the submodulation process. After limiting, the wave will be back to the initial constant-level-modulated form except that all its components may have been translated in frequency by some common and perhaps varying percentage because of the Doppler effect.

The signal in the second channel is detected in an ordinary diode detector 9 and the sinusoid corresponding to the amplitude modulation is recovered. On the assumption, for the moment, that the frequency of this recovered low-frequency sinusoid has been shifted, because of Doppler effect, by the same common percentage as have the components of the composite R.-F. wave, it is clear that the sinusoid may be subjected to a succession of multiplications and filtrations to the point at which the missing-carrier frequency, shifted by Doppler by the same percentage as the intelligence components in the first branch channel, is reached. This is accomplished by multiplier 10. The resulting wave at this final frequency then becomes the re-created carrier which is necessary to detect the signal at the output of the limiter. This detection is accomplished by single sideband detector 11.

It remains to be shown only that the frequency of the detected sinusoid, before multiplication, has been Doppler-shifted from the original submodulation frequency by the same percentage as have the R.-F. components of the constant-level-modulation wave present at the output of the first channel. For this purpose let the following be the frequencies, at the output terminals of the transmitter, present in the composite wave when the intelligence to be conveyed consists of but a single tone.

$f_c$=initial frequency of the missing carrier, $f_c+f_m$=initial frequency of the sideband element corresponding to the tone being conveyed (upper-sideband transmission being assumed), $f_c+f_m+\frac{f_c}{n}$=initial frequency of the lower sub-sidestone, and $f_c+f_m+\frac{f_c}{n}$=initial frequency of the upper sub-sidestone, where $n$ is the integral ratio of the initial frequency of the missing carrier to the initial frequency of the amplitude-modulating sine wave. At the receiver the corresponding frequencies, having been changed percentagewise by Doppler effect, may be expressed as $kf_c$, $k(f_c+f_m)$, $$k\left(f_c+f_m-\frac{f_c}{n}\right) \text{and } k\left(f_c+f_m+\frac{f_c}{n}\right)$$

respectively. With the $kf_c$ component missing, the spectrum will be that of a carrier, at the frequency $k(f_c+f_m)$, which has been modulated by a sine wave of frequency $$k\frac{f_c}{n}$$

This is the frequency of the sinusoid which is recovered by envelope detection in the second channel discussed above. When this frequency is multiplied by the integral number $n$, the result is $kf_c$, exactly the frequency of the missing carrier needed in the first channel. It is thus seen that the only prior knowledge needed at the receiver is that of the proper multiplication factor, $n$, and this factor can be prearranged or standardized.

It may be desired to employ a superheterodyne principle in the receiver rather than to convert the incoming signal directly from radio frequencies to audio by means such as synchronous detection. A receiver operating on this principle is shown in FIG. 3. This system permits use of exactly the same transmitter as before and allows a synthesized carrier of the exact frequency of the missing Doppler-shifted carrier to be established at the receiver, Doppler shift having been automatically corrected for. It should be emphasized that the receiver to be discussed now, as well as the one discussed just previously, could be used simultaneously to receive a signal from the same transmitter, the frequency of the synthesized carrier in the receiver being precisely that needed in both cases.

Assume in FIG. 3 that the received signal corresponds to an original intelligence modulation consisting of a single tone, and in addition, assume that the signal has amplitude modulation corresponding to the carrier submultiple. As before, let the frequencies of these, after modification by Doppler shift, be $k(f_c+f_m)$, $$k\left(f_c+f_m-\frac{f_c}{n}\right) \text{ and } k\left(f_c+f_m+\frac{f_c}{n}\right)$$

where k is the ratio of the frequency after Doppler shift to the corresponding frequency at the transmitting antenna. Again the missing-carrier frequuency, as received, is $kf_c$.

Now, following the R.-F. selectivity and amplification in the receiver, these components go to a conventional mixer 12 being fed by a local oscillator 13 of frequency $f_o$. The resulting intermediate frequencies are, respectively, $$k(f_c+f_m)-f_o$$

$$[k(f_c+f_m)-f_o]-k\frac{f_c}{n}$$

and $$[k(f_c+f_m)-f_o]+k\frac{f_c}{n}$$

Thus, the components make up the spectrum of an intermediate frequency carrier, of frequency $k(f_c+f_m)-f_o$, being amplitude modulated by a sinusoid of frequency $$k\frac{f_c}{n}$$

The converted signal may now be amplified in an I.-F. amplifier 14 having a bandwidth sufficient to pass the originally transmitted signal plus the Doppler shift plus the sidebands due to amplitude modulation plus any frequency error.

After the I.-F. amplification, the composite signal is fed into two channels. In the first of these channels the composite signal is amplitude-limited in limiter 8 to remove all the amplitude modulation. The signal then goes to a single-sideband detector 11 (or to other types of detectors, such as an adder followed by a conventional detector) where the simultaneous input of a synthesized I.-F. carrier, obtained as described below, permits the constant-level audio to be recovered.

In the second channel the I.-F. signal passes to an envelope detector 9 where $$k\frac{f_c}{n}$$

the amplitude-modulation frequency modified by Doppler shift, is recovered. This frequency is then multiplied by the factor $n$ in multiplier 10. The signal at the resulting frequency, $kf_c$ (which is the Doppler-shifted radio frequency of the missing carrier), next goes to a mixer 15 where it is mixed with a signal from the same local oscillator 13 used in the original frequency conversion of the composite signal. From the output of this second mixer a component at the frequency $kf_c-f_o$ is obtained. This is the synthesized I.-F. carrier needed for detection.

It is seen, as before, that for this receiver the only prior knowledge needed at the receiver is that of the proper multiplication factor, $n$, and this factor can be prearranged or standardized.

The system next to be described offers a performance improvement over the system just discussed, since greater overall I.-F. selectivity than before may be employed. This is true because of a reduction in the excess bandwidth needed to accommodate the Doppler-shifted signal in the latter I.-F. selective circuits. How important the improvement will be depends largely upon how great is the absolute Doppler shift in the R.-F. received wave compared to the total I.-F. bandwidth which would be required if no Doppler shift existed. Certainly there are possible cases for which the Doppler effect on the I.-F. bandwidth required is not negligible. It will be realized, however, that the improvement which this system offers is obtained at the expense of some increase in the complexity of both the transmitter and the receiver. Also, the transmitters and the receivers, respectively, are not interchangeable between this system and the previous ones.

The transmitter of the present system, shown in FIG. 4, differs from that of the previously mentioned systems only in that the amplitude modulation is altered. In the present system two amplitude-modulating tones are used, the frequencies of the two being $$\frac{f_o}{n} \text{ and } \frac{f_c-f_o}{N}$$

where $n$ and N are integers, $f_c$ is the frequency of the untransmitted carrier, and $f_o$ is one-$k$th the frequency required of a local oscillator to be synchronized in the receiver. Here, again, $k$ accounts for Doppler shift and is the ratio of the apparent frequency of a given signal component at the receiver, to the frequency of the same component at the transmitter.

A block diagram of the receiver is shown in FIGURE 5. Here, as before, an envelope detector 9 is used to recover the A-M tones. These two tones can be separated by filters 15 and 16 and the frequency of each can be multiplied by the appropriate factor as shown in multipliers 17 and 18. The frequencies after multiplication will be $kf_o$ and $k(f_c-f_o)$. These components may now be used to synchronize the locked oscillators 19 and 20, or each locked oscillator may, by locking on a submultiple of its output frequency, serve as the final stage of frequency multiplication. Oscillator 19—the one feeding the mixer—is essential, while the other may be dispensed with if the output from the (×N) frequency multiplier is already relatively constant in amplitude with variations of signal strength at the receiver.

Now, consider an incoming signal corresponding to intelligence transmitted with an initial frequency of $f_c+f_m$. The received frequency will be $k(f_c+f_m)$, as compared to the frequency, $kf_c$, of the missing carrier reference to the receiver. In the mixer 12 the components of the signal and the local oscillator 19, at frequencies $k(f_c+f_m)$ and $kf_o$ respectively, produce a resultant at frequency $k(f_c+f_m-f_o)$. In the single-sideband detector 11 the product of the foregoing resultant with the output from the second synchronized oscillator 20 (or its equivalent), at the frequency $k(f_c-f_o)$, gives a component at the difference frequency, $kf_m$. Thus, the original intelligence is recovered, modified only by the factor $k$. Since $k$ differs from unity by an exceedingly small percentage, the total error in the recovered audio is almost certain to be negligible.

I claim:

A single-sideband zero-carrier communication system comprising a transmitter, a receiver and an interconnecting link therebetween; said transmitter comprising means for generating from applied carrier and modulating signals a constant level single-sideband signal, a local oscillator of frequency different from the frequency of said carrier signal, means for deriving a signal having a frequency equal to the difference between said carrier and local oscillator frequencies, means for amplitude modulating said single-sideband signal at a submultiple of said local oscillator frequency and a submultiple of said difference frequency, and means for applying said amplitude modulated single-sideband signal to said transmission link; said receiver comprising means for receiving said amplitude modulated single-sideband signal from said transmission link, a mixer, a synchronous oscillator, means for applying said received signal and the output of said synchronous oscillator to said mixer, an amplitude limiter, an envelope detector, means for applying the output of said mixer to said limiter and envelope detector in parallel, a first frequency multiplier having a multiplying factor equal to the ratio of said local oscillator frequency to said local oscillator submultiple frequency, a second frequency multiplier having a multiplying factor equal to the ratio of said difference frequency to said difference submultiple frequency, means for selecting signals of the local oscillator submultiple frequency range from the output of said envelope detector and applying them to said first multiplier, means for selecting signals of the difference frequency submultiple frequency range and applying them to said second frequency multiplier, means for applying the output of said first multiplier as a synchronizing signal to said synchronous oscillator, a single-sideband detector, and means for applying the outputs of said limiter and said second frequency multiplier to said single-sideband detector.

No references cited.

DAVID G. REDINBAUGH, *Primary Examiner.*